United States Patent
Liu et al.

(10) Patent No.: US 12,485,151 B2
(45) Date of Patent: Dec. 2, 2025

(54) USE OF *Lactobacillus paracasei* SUBSP. *paracasei* K56 IN ALLEVIATION OF INTESTINAL INFLAMMATION

(71) Applicants: Inner Mongolia Yili Industrial Group Co., Ltd., Hohhot (CN); Inner Mongolia Dairy Tech Res Institute Co Ltd, Hohhot (CN)

(72) Inventors: Wei-Hsien Liu, Hohhot (CN); Wen Zhao, Hohhot (CN); Ting Sun, Hohhot (CN); Wei-Lian Hung, Hohhot (CN); Chao Wu, Hohhot (CN); Guowen Ma, Hohhot (CN); Haibin Zhang, Hohhot (CN)

(73) Assignees: Inner Mongolia Yili Industrial Group Co., Ltd., Hohhot (CN); Inner Mongolia Dairy Tech Res Institute Co Ltd, Hohhot (CN)

( * ) Notice: Subject to any disclaimer, the term of this patent is extended or adjusted under 35 U.S.C. 154(b) by 588 days.

(21) Appl. No.: 17/778,609

(22) PCT Filed: Nov. 19, 2020

(86) PCT No.: PCT/CN2020/130032
§ 371 (c)(1),
(2) Date: May 20, 2022

(87) PCT Pub. No.: WO2021/098764
PCT Pub. Date: May 27, 2021

(65) Prior Publication Data
US 2023/0000932 A1  Jan. 5, 2023

(30) Foreign Application Priority Data

Nov. 20, 2019 (CN) .......................... 201911139707.X (51) Int. Cl.
| | | |
|---|---|---|
| *A61K 35/747* | (2015.01) | |
| *A23K 10/18* | (2016.01) | |
| *A23L 33/135* | (2016.01) | |
| *A61P 1/00* | (2006.01) | |
| *A61P 29/00* | (2006.01) | |

(52) U.S. Cl.
CPC ............ *A61K 35/747* (2013.01); *A23K 10/18* (2016.05); *A23L 33/135* (2016.08); *A61P 1/00* (2018.01); *A61P 29/00* (2018.01); *A23V 2002/00* (2013.01); *A23V 2400/165* (2023.08)

(58) Field of Classification Search
None
See application file for complete search history.

(56) References Cited

U.S. PATENT DOCUMENTS

| | | | |
|---|---|---|---|
| 2008/0311097 A1* | 12/2008 | Israelsen | A61P 1/14 424/93.4 |
| 2011/0038837 A1 | 2/2011 | Nishida et al. | |
| 2021/0077550 A1 | 3/2021 | Ko et al. | |
| 2021/0085731 A1 | 3/2021 | Tsai et al. | |

FOREIGN PATENT DOCUMENTS

| | | | | |
|---|---|---|---|---|
| CN | 101626774 A | | 1/2010 | |
| CN | 107916236 A | * | 4/2018 | ............ C12N 1/205 |
| CN | 108348559 A | | 7/2018 | |
| CN | 109479961 A | | 3/2019 | |
| CN | 109486700 A | | 3/2019 | |
| CN | 110302214 A | | 10/2019 | |
| CN | 110892940 A | | 3/2020 | |
| KR | 20190111582 A | | 10/2019 | |
| WO | 2019134690 A1 | | 7/2019 | |
| WO | 2019216662 A1 | | 11/2019 | |

OTHER PUBLICATIONS

Neurath, "Cytokines in inflammatory bowel disease", Nature Reviews, vol. 14, pp. 329-342 (Year: 2014).*
John et al., "Epithelial Barriers in Intestinal Inflammation", Antioxidants & Redox Signaling, vol. 15, pp. 1255-1270 (Year: 2011).*
Kim et al., "Administration of Lactobacillus paracasei strains improves immunomodulation and changes the composition of gut microbiota leading to improvement of colitis in mice", Journal of Functional Foods, vol. 52, pp. 565-575 (Year: 2019).*
Chen et al., "Therapeutic effects of *Lactobacillus paracasei* subsp. *paracasei* NTU 101 powder on dextran sulfate sodium-induced colitis in mice", Journal of Food and Drug Analysis 2019, vol. 27, pp. 83-92 (Year: 2019).*
Supplementary European Search Report for EP Application No. 20 88 9355, "New Application of Lactobacillus Paracasei K56 in Relieving Intestinal Inflammation" issued on Dec. 7, 2023.
International Search Report for International Application No. PCT/CN2020/130032, New Application of Lactobacillus Paracasei K56 in Relieving Intestinal Inflammation mailed on Feb. 23, 2021.
Written Opinion for International Application No. PCT/CN2020/130032, New Application of Lactobacillus Paracasei K56 in Relieving Intestinal Inflammation mailed on Feb. 23, 2021.
Kim, W.K., et al., "Administration of Lactobacillus paracasei strains improves immunomodulation and changes the composition of gut microbiota leading to improvement of colitis in mice", Journal of Functional Foods, 52 (2019) 565-575.

(Continued)

*Primary Examiner* — Michelle F. Paguio Frising
(74) *Attorney, Agent, or Firm* — Hamilton, Brook, Smith & Reynolds, P.C.

(57) ABSTRACT

The present invention provides novel use of *Lactobacillus paracasei* subsp. *paracasei* K56 in alleviation of intestinal inflammation. *Lactobacillus paracasei* subsp. *paracasei* K56 of the present invention has the deposit number CGMCC 15139 or DSM 27447. It was discovered in the present invention that the strain alone was highly efficacious at alleviating intestinal inflammation, reducing inflammatory factors IL-6 and/or TNF-α, promoting the anti-inflammatory factor IL-10, and reducing the tissue damage of colitis.

7 Claims, 5 Drawing Sheets

(56) References Cited

OTHER PUBLICATIONS

Search report issued on Jul. 1, 2022 for counterpart Chinese patent application No. 201911139707.X, "New Application of Lactobacillus Paracasei K56 in Relieving Intestinal Inflammation" issued Jul. 1, 2022.
Tsai Y.T. et al., The immunomodulatory effects of lactic acid bacteria for improving immune functions and benefits. Appl Microbiol Biotechnol, Sep. 23, 2012, vol. 96, No. 4.
Written Opinion and Search Report issued on Sep. 11, 2024 for counterpart Singapore patent application No. 11202205377Y, New Use of *Lactobacillus paracasei* Subsp. *paracasei* K56 in Alleviation of Intestinal Inflammation.

* cited by examiner

Control group

Model group

K56 low-dose group

K56 medium-dose group

K56 high-dose group

USE OF *Lactobacillus paracasei* SUBSP. *paracasei* K56 IN ALLEVIATION OF INTESTINAL INFLAMMATION This application is the U.S. National Stage of International Application No. PCT/CN2020/130032, filed Nov. 19, 2020, which designates the U.S., published in Chinese, and claims priority under 35 U.S.C. § 119 or 365 (c) to Chinese Application No. 201911139707.X, filed Nov. 20, 2019. The entire teachings of the above applications are incorporated herein by reference.

TECHNICAL FIELD

The present invention relates to the technical field of microbiology, and in particular to a new use of *Lactobacillus paracasei* subsp. *paracasei* K56 with deposit number CGMCC 15139 or DSM 27447 in alleviation of intestinal inflammation.

BACKGROUND ART

With the impacts of environmental factors, diet, and lifestyle habits on the microenvironment of intestinal flora, the incidence of enteritis is also increasing year by year, and enteritis has become one of the major diseases affecting human health worldwide. A large number of studies have shown that oxidative damage to intestinal cells results in mucosal damage, infection of intestinal epithelial cells, and release of toxins and other harmful substances, causing damage and death of intestinal epithelial cells, increased permeability of intestinal epithelium, and pathogenic bacteria crossing the damaged intestinal mucosal barrier, which triggers a series of immune responses, resulting in production of a large number of cytokines by macrophages, overstimulation of T cells, production of pro-inflammatory factors, and inflammation of epithelial cells.

Traditional treatments of enteritis can be categorized into modern medical treatment and Chinese herbal treatment. With the development of science and technology, regulating the balance of intestinal flora through external supplementation of probiotics has also become an important method to reduce intestinal inflammation. As an endogenous immune defense barrier in the intestinal tract, probiotics are able to antagonize pathogenic bacteria, safe, controllable, and effective, and have few side effects, making them an ideal treatment for enteritis. The mechanism of probiotic treatment of enteritis is not well elucidated yet, but is generally attributed to the fact that probiotics can inhibit colonization of pathogenic bacteria through competition for nutrients and co-receptors, or directly inhibit pathogenic bacteria by production of bacteriocins, or isolate pathogenic bacteria and their toxins by production of antitoxin proteases. Probiotics adjust imbalanced immune responses and suppress host mucosal damage by maintaining normal intestinal flora, strengthening the mucosal barrier effect, and inhibiting exposure of the immune system to inflammatory signals. In addition, the World Gastrointestinal Organization (WGO) Global Guidelines indicates the use of probiotic preparations as a medicament for inflammatory bowel diseases.

SUMMARY OF THE INVENTION

An objective of the present invention is to provide a new use of *Lactobacillus paracasei* subsp. *paracasei* K56.

*Lactobacillus paracasei* subsp. *paracasei* K56 was deposited in the German Collection of Microorganisms and Cell Cultures on Jun. 27, 2013 with deposit number DSM 27447; and was also deposited in the China General Microbiological Culture Collection Center (CGMCC) on Dec. 29, 2017 with deposit number CGMCC 15139.

It was discovered in the present invention that the strain *Lactobacillus paracasei* subsp. *paracasei* K56 alone is efficacious at alleviating intestinal inflammation, decreasing the level of inflammatory factors IL-6 and/or TNF-α, promoting anti-inflammatory factor IL-10, and reducing tissue damage in colitis.

Therefore, the present invention provides use of *Lactobacillus paracasei* subsp. *paracasei* in the manufacture of a composition for alleviating intestinal inflammation, wherein the *Lactobacillus paracasei* subsp. *paracasei* has the deposit number CGMCC 15139 or DSM 27447.

In other words, the present invention provides *Lactobacillus paracasei* subsp. *paracasei* for use in alleviation of intestinal inflammation, wherein the *Lactobacillus paracasei* subsp. *paracasei* has the deposit number CGMCC 15139 or DSM 27447. The *Lactobacillus paracasei* subsp. *paracasei* may be present in a form of a composition comprising it.

From another perspective, the present invention also provides a method for alleviating intestinal inflammation, comprising administering to a subject an effective amount of *Lactobacillus paracasei* subsp. *paracasei*, wherein the *Lactobacillus paracasei* subsp. *paracasei* has the deposit number CGMCC 15139 or DSM 27447. The *Lactobacillus paracasei* subsp. *paracasei* may be administered to the subject in a form of a composition comprising it.

According to a specific embodiment of the present invention, the *Lactobacillus paracasei* subsp. *paracasei* is used in a form of solid or liquid bacterial preparation to manufacture the composition.

According to a specific embodiment of the present invention, the composition may comprise a food composition, a feed composition or a pharmaceutical composition.

According to a specific embodiment of the present invention, the composition may be administered to animals or humans. The composition may also comprise conventional ingredients in the art. For example, for a pharmaceutical composition, a suitable amount of auxiliary may be included, and the auxiliary may be an excipient, a diluent, a filler, an absorption enhancer, and the like. For a food composition, lactobifidobacteria according to the present invention can be produced according to food products containing lactobifidobacteria in the prior art, and the composition can be in different forms depending on the needs of the subject. Examples include powder, ingots, granulation, microcapsules, liquid formulations, and the like.

According to a specific embodiment of the present invention, the composition is for use in reducing inflammatory factors IL-6 and/or TNF-α. For specific applications, the *Lactobacillus paracasei* subsp. *paracasei* is used in an amount of $1.0 \times 10^6$ CFU~$1.0 \times 10^{13}$ CFU/day, preferably $1.0 \times 10^9$ CFU~$1.0 \times 10^{11}$ CFU/day.

According to a specific embodiment of the present invention, the composition is for use in promoting anti-inflammatory factor IL-10. For specific applications, the *Lactobacillus paracasei* subsp. *paracasei* is used in an amount of $1.0 \times 10^6$ CFU~$1.0 \times 10^{13}$ CFU/day, preferably $1.0 \times 10^9$ CFU~$1.0 \times 10^{12}$ CFU/day, more preferably $1.0 \times 10^9$ CFU~$1.0 \times 10^{11}$ CFU/day. The *Lactobacillus paracasei* subsp. *paracasei* K56 according to the present invention has significant beneficial effects far beyond a reasonable expectation by a person skilled in the art, in terms of manufacture of a composition for promoting anti-inflammatory factor IL-10, According to a specific embodiment of the present invention, the composition is for use in reducing tissue damage in colitis. For specific applications, the *Lactobacillus paracasei* subsp. *paracasei* is used in an amount of $1.0 \times 10^6$ CFU~$1.0 \times 10^{13}$ CFU/day, preferably $1.0 \times 10^9$ CFU~$1.0 \times 10^{12}$ CFU/day, more preferably $1.0 \times 10^9$ CFU~$1.0 \times 10^{11}$ CFU/day.

In a specific embodiment of the present invention, the composition is a food composition, and the food may be a fermented dairy product (e.g. fermented milk, flavored fermented milk, a fermented milk beverage, and the like), cheese, a dairy-containing beverage, a solid beverage, dairy powder, or the like.

In another specific embodiment of the present invention, the composition is a feed composition. The other components in the feed composition can be selected with reference to conventional techniques in the field of probiotic feed.

In another specific embodiment of the present invention, the composition is a pharmaceutical composition. The other components in the pharmaceutical composition can be selected with reference to conventional techniques in the field of probiotic drugs.

In summary, the present invention provides a new use of *Lactobacillus paracasei* subsp. *paracasei* K56, which is highly efficacious at alleviating intestinal inflammation, reducing inflammatory factors IL-6 and/or TNF-α, promoting the anti-inflammatory factor IL-10, and reducing tissue damage in colitis, and can be used in the manufacture of food, drugs, and feed efficacious at alleviating intestinal inflammation, useful in a wide range of applications.

DETAILED DESCRIPTION OF THE INVENTION

In order to provide a better understanding of the technical features, purpose and beneficial effects of the present invention, the following detailed description of the technical solutions of the present invention is provided in conjunction with specific examples, and it should be understood that these examples are used only to illustrate the invention and not to limit the scope of the invention.

In the examples, each original reagent and material are commercially available, and the experimental methods without specific conditions indicated are conventional methods under conventional conditions known in the art, or conducted under the conditions recommended by the manufacturer of instrument.

Example 1

Experiment on the efficacy of *Lactobacillus paracasei* subsp. *paracasei* K56 at alleviating intestinal inflammation 1. Experimental Materials Healthy BABL/c male mice, purchased from Beijing Huafukang Biotechnology Co. Ltd., were bred in the animal house of CDC maintained at room temperature ($25\pm2°$ C.) and relative humidity of ($55\pm2$)%, under 12 h/12 h alternating day/night light, and allowed free access to food and water.

2. Experimental Methods 2.1 Animal Grouping and Handling 112 healthy BABL/c male mice, aged 6-8 weeks and weighing 20-22 g, were randomly divided based on body weight into 8 groups, with 14 mice per group. Each group was bred in two cages with 7 animals per cage, numbered with picric acid, and adapted for 5 days with normal feed. The details of the groups and sample volumes are shown in Table 1. The mice were subjected to intervention by gavage with a volume of 0.4 ml/20 g. The intervention period was 14 days.

TABLE 1

Experimental grouping

| Grouping | Test drug | Number of animals | Gavage volume for mice (cfu/20 g) |
|---|---|---|---|
| Control group | PBS | 14 | — |
| Model group | PBS | 14 | — |
| K56 low-dose group | K56 | 14 | $1 \times 10^7$ |
| K56 medium-dose group | K56 | 14 | $1 \times 10^8$ |
| K56 high-dose group | K56 | 14 | $1 \times 10^9$ |

Among the eight groups of mice, except for the control group, 7 groups required DSS induction for establishment of an experimental colitis model. On day 8 of the experiment, a 5.0% aqueous solution of DSS was prepared to replace drinking water and the mice consumed it freely for 7 days, while the normal group consumed distilled water. The mice were observed every day for changes in physical signs.

2.2 Colon Length and Weight Measurement

After the intervention, the mice were anesthetized by intraperitoneal injection of sodium pentobarbital, blood was taken from the abdominal aorta, and serum was separated by centrifugation. The colon of each mouse was isolated, rinsed several times with PBS, and measured for length, and ⅔ of the colon was cut and stored in a centrifuge tube at −80° C. The other ⅓ was stored in a 10% formalin solution for fixation.

2.3 Observation and Scoring of Histopathology of the Colon

After the colon was fixed in the formalin solution, it was sequentially dehydrated, waxed, embedded, sectioned, bathed and baked, dewaxed and rehydrated, HE stained, and finally microscopically observed for histomorphology.

Histological scoring was performed using the Fedorak histological scoring criteria. The histology injury scoring criteria are shown in Table 2.

TABLE 2

Histology injury scoring criteria

| Score | Inflammation | Lesion depth | Recess damage | Extent of lesion |
|---|---|---|---|---|
| 0 | none | none | none | / |
| 1 | Mild | Submucosa | Basal ⅓ recess, damaged | 1%-25% |
| 2 | Medium | Muscular layer | Basal ⅔ recess, damaged | 26%-50% |

TABLE 2-continued

Histology injury scoring criteria

| Score | Inflammation | Lesion depth | Recess damage | Extent of lesion |
|---|---|---|---|---|
| 3 | / | Serosa layer | Intact surface epithelium only | 51%-75% |
| 4 | / | / | All recess and epithelium damaged | 76%-100% |

2.4 Measurement of Cytokines in Serum

The levels of cytokines IL-6, IL-10, and TNF-α in the colons of mice were measured according to the ELISA kit instructions.

2.5 Statistical Analysis Methods

Experimental data were expressed as Mean±S.E.M. Data were processed using PRISM version 5.0 (GraphPad, San Diego, CA, USA). Differences between groups were evaluated using one-way ANOVA following Tukery's multiple comparison test. $P<0.05$ indicates a statistically significant difference.

3. Experimental Results and Analysis 3.1 Changes in Body Weight of Mice

The body weights of mice at 0, 7, and 14 days were measured and the results are shown in Table 3.

TABLE 3

Changes in body weight of mice

| Grouping | Day 0 | Day 7 | Day 14 |
|---|---|---|---|
| Control group | 20.92 ± 0.56 | 22.25 ± 0.88 | 22.68 ± 1.02 |
| Model group | 21.36 ± 0.99 | 23.18 ± 1.21 | 19.19 ± 2.28* |
| Low-dose group | 21.36 ± 0.69 | 22.98 ± 1.19 | 20.22 ± 1.73* |
| Medium-dose group | 21.10 ± 0.82 | 23.12 ± 0.84 | 19.54 ± 2.61* |
| High-dose group | 20.87 ± 0.64 | 22.08 ± 0.70 | 18.87 ± 1.75* |

Note:
*The difference is significant as compared with the control group.

On day 0, there was no significant difference ($p<0.05$) in body weight between the mice groups, indicating that the mice were in the same condition at the beginning of the experiment, and the experimental deviation caused by a difference in body weight of the mice can be excluded. After 7 days of sample administration, the body weight of mice increased in all groups, with no significant difference ($p<0.05$) in body weight between the mice groups, indicating that the short-time sample intervention had no effect on the body weight gain of mice. After 7 days under 5% DSS instead of drinking water, the body weight of all mice in the model group decreased significantly ($p<0.05$), while there was no significant change in the body weight of the control group ($p>0.05$). Meanwhile, the mouse status observation results indicated successful modeling in the model group. After modeling, the body weight of mice in both the model group and the intervention groups significantly decreased, indicating that despite the sample intervention, the body weight of mice still decreased due to the intestinal damage caused by DSS. After modeling, the body weight of mice in each intervention group was significantly lower than that in the control group ($p<0.05$), but showed no significant difference from that in the model group ($p>0.05$), indicating that the samples had a limited intervention effect on the body weight of mice molded by DSS.

3.2 Characterization of DSS-Induced Colonic Inflammation in Mice

From day 0 to day 7, mice in each group showed smooth fur, an active spirit, a quick response, normal feeding activity, and spherical or striped stools without diarrhea or bloody stools. After 7 days of modeling, mice in both the model group and the intervention groups were induced with 5.0% DSS to build an experimental colitis model. The changes in the physical signs of the mice in each experimental group during the modeling period were observed separately, and the relevant results are shown in Table 4.

TABLE 4

Observation of physical signs of mice

| Grouping | Number of mice | Time of diarrhea (n days after modeling) | Time of bloody stools (n days after modeling) | Number of mice with bloody stools | Number of deaths |
|---|---|---|---|---|---|
| Control group | 14 | — | — | 0 | 0 |
| Model group | 14 | 3 | 3 | 14 | 0 |
| Low-dose group | 14 | 3 | 4 | 6 | 0 |
| Medium-dose group | 14 | 3 | 4 | 7 | 0 |
| High-dose group | 14 | 3 | 4 | 6 | 1 |

The observation of intestinal inflammation symptoms in mice showed that the intervention effect of each sample on DSS-modeled mice was manifested in two aspects: (1) the number of mice with bloody stools decreased at the end of the experiment; (2) the time of appearance of bloody stools in mice was delayed by 1-2 days compared with the model group. Because this modeling was done with 5% DSS instead of drinking water, and probably because the mice had different uptake and tolerance of DSS, the number of death did not change with the dose.

3.3 Spleen Weight of Mice in the Groups

The spleen weights of mice in each group are shown in Table 5. As compared with the control group, the splenic indices of mice in the model group were all significantly higher than those in the control group ($p<0.05$), indicating that 5% DSS can stimulate proliferation of lymphocytes and macrophages in the spleen of mice and stimulate the body to exert cellular and humoral immunological functions. The K56-medium-dose group showed a decreasing tendency in splenic index, suggesting that the K56-medium-dose group may have a function of reducing inflammatory responses of the organism.

TABLE 5

The spleen weight and splenic index of mice

| Grouping | Spleen weight (g) | Splenic index |
|---|---|---|
| Control group | 0.081 ± 0.011 | 0.36 ± 0.05 |
| Model group | 0.085 ± 0.021 | 0.44 ± 0.09* |

TABLE 5-continued

The spleen weight and splenic index of mice

| Grouping | Spleen weight (g) | Splenic index |
| --- | --- | --- |
| Low-dose group | 0.090 ± 0.021 | 0.45 ± 0.11* |
| Medium-dose group | 0.074 ± 0.019 | 0.38 ± 0.09 |
| High-dose group | 0.093 ± 0.025 | 0.49 ± 0.11* |

Note:
*The difference is significant as compared with the control group.

3.4 Test Indicators 3.4.1 Measurement of Mouse Colon Length

The results of mouse colon length are shown in Table 6. After modelling, the colon length of mice in the model group was significantly lower than that of the control group ($p<0.05$). After the sample intervention, there was no significant difference in colon length between each mice group and the model group ($p>0.05$), indicating that the main effect on the colon length of mice in this experiment was from the 5% DSS, and the short-term sample intervention showed no significant effect on the colon length of mice.

TABLE 6

Results of colon length measurement in mice

| Grouping | Colon length (cm) |
| --- | --- |
| Control group | 12.51 ± 0.92 |
| Model group | 7.78 ± 1.53* |
| Low-dose group | 8.66 ± 0.92* |
| Medium-dose group | 8.43 ± 1.10* |
| High-dose group | 8.53 ± 0.59* |

Note:
*The difference is significant as compared with the control group.

3.4.2 Colonic IL-6 Assay Results

Figure 1:
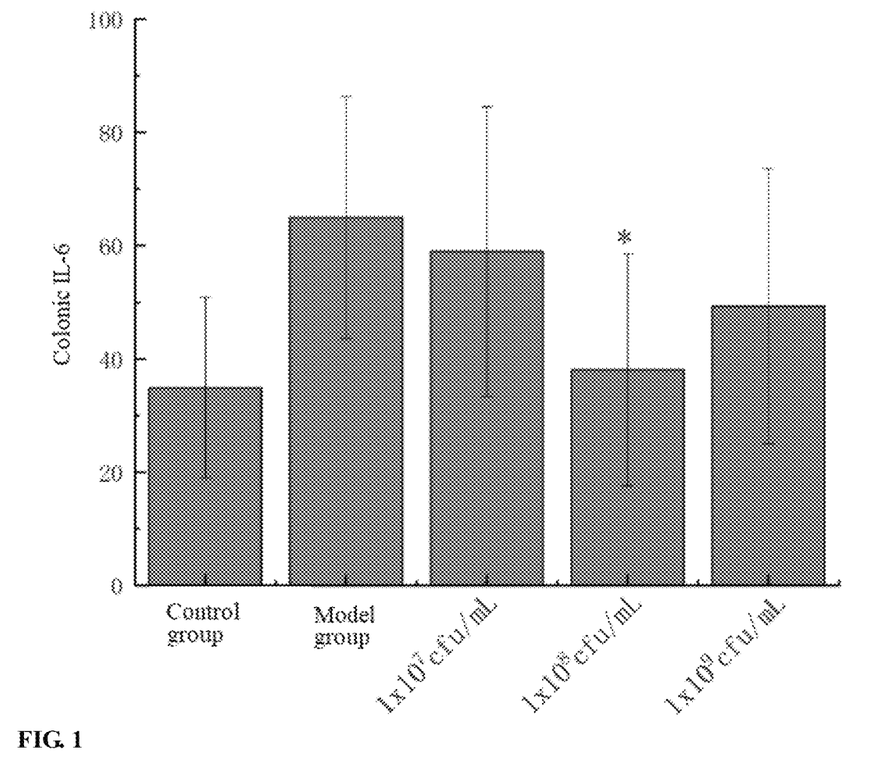
FIG. 1 shows the effect of *Lactobacillus paracasei* subsp. *paracasei* K56 on colonic IL-6 in mice.

The results of changes in colonic IL-6 are shown in FIG. 1. As compared with the control group, colonic IL-6 was significantly higher in the model group mice ($p<0.05$), indicating that DSS intervention in mice can cause an increase in intestinal inflammatory responses in mice, as evidenced by an increase in the inflammatory factor IL-6. As compared with the model group, the colonic IL-6 of mice in the K56-medium-dose group was significantly lower than that in the model group ($p<0.05$); indicating that the probiotic intervention reduced intestinal inflammatory responses of mice at medium and high doses of K56.

3.4.3 Colonic IL-10 Assay Results

Figure 2:
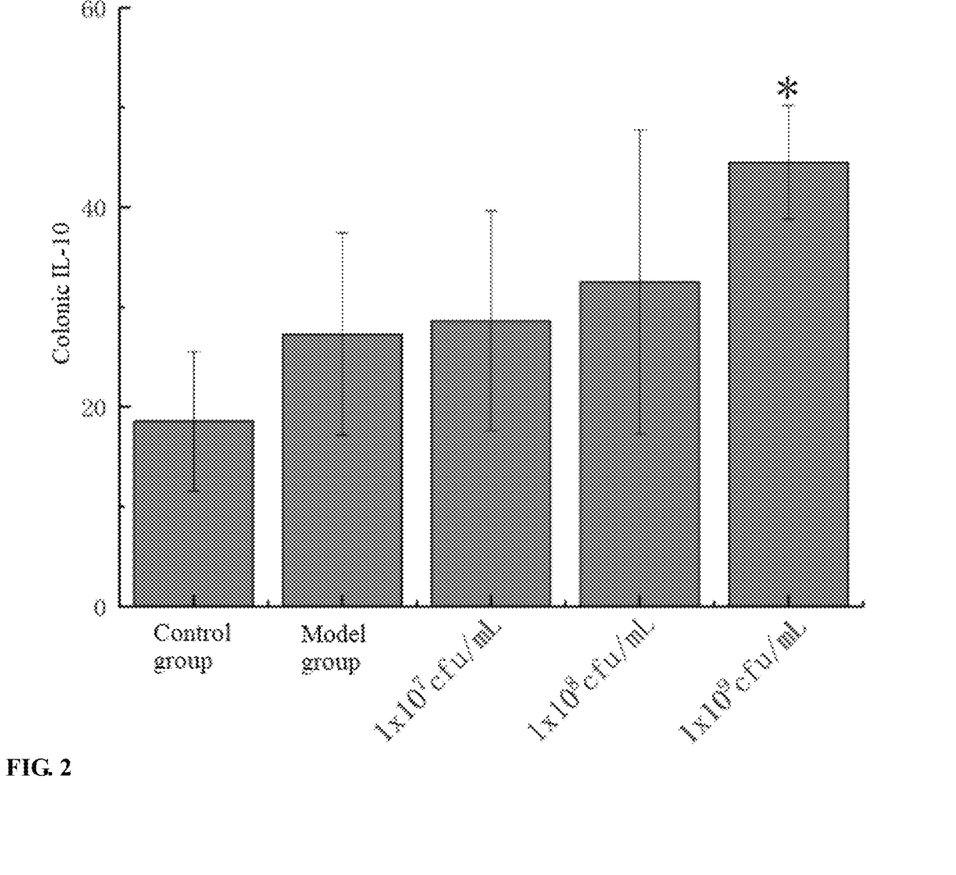
FIG. 2 shows the effect of *Lactobacillus paracasei* subsp. *paracasei* K56 on colonic IL-10 in mice.

The results of changes in colonic IL-10 are shown in FIG. 2. As compared with the control group, colonic IL-10 in the model group increased but the difference was not significant ($p>0.05$), indicating that the modeling has a tendency of causing increased secretion of the intestinal anti-inflammatory factor IL-10. As compared with the model group, IL-10 increased in all groups, with a significant increase ($p<0.05$) in colonic IL-10 in the K56-high-dose group ($2.5\times10^9$ cfu/mL) of mice, indicating that K56 intervention has an effect of promoting production of the anti-inflammatory factor IL-10 by intestinal anti-inflammatory cells.

3.4.4 Colonic TNF-α Assay Results

Figure 3:
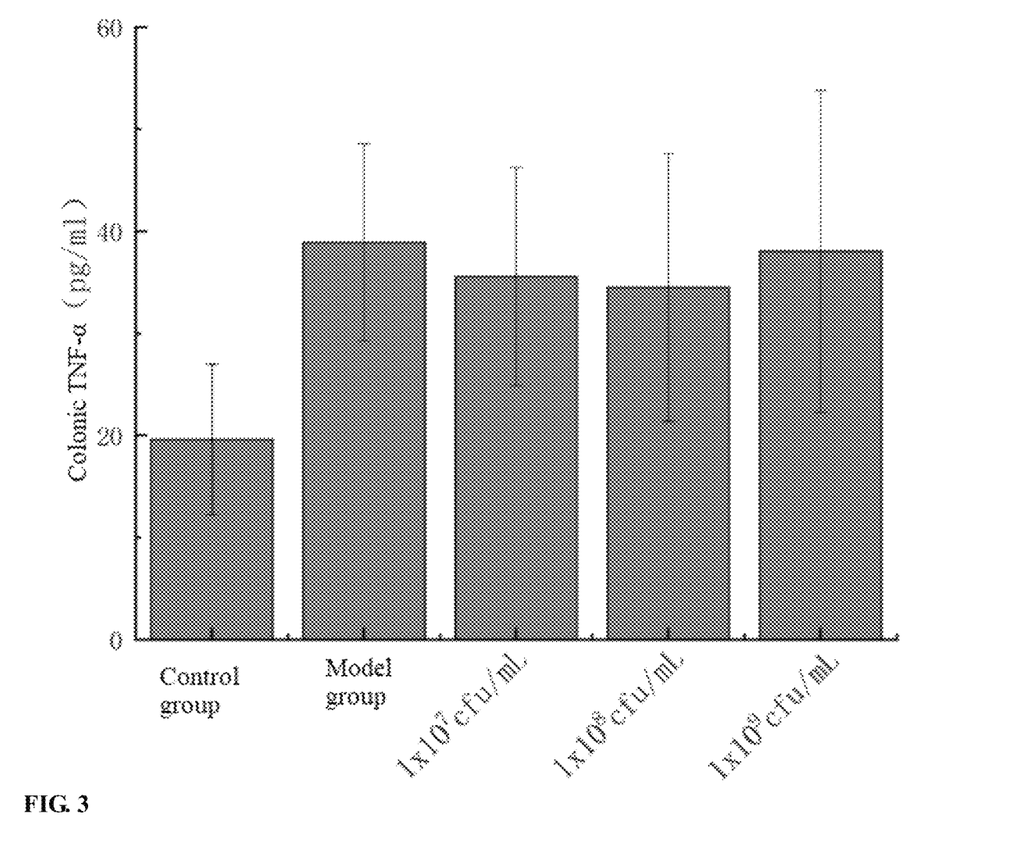
FIG. 3 shows the effect of *Lactobacillus paracasei* subsp. *paracasei* K56 on colonic TNF-α in mice.

The results of changes in colonic TNF-α are shown in FIG. 3. As compared with the model group, the low-, medium-, and high-dose groups of probiotic K56 according to the present invention all showed a decreasing trend for colonic TNF-α, indicating that K56 can reduce intestinal inflammatory responses and reduce secretion of the colonic inflammatory factor TNF-α.

3.4.5 Pathology Results 3.4.5.1 Pathological Sections

Figure 4:
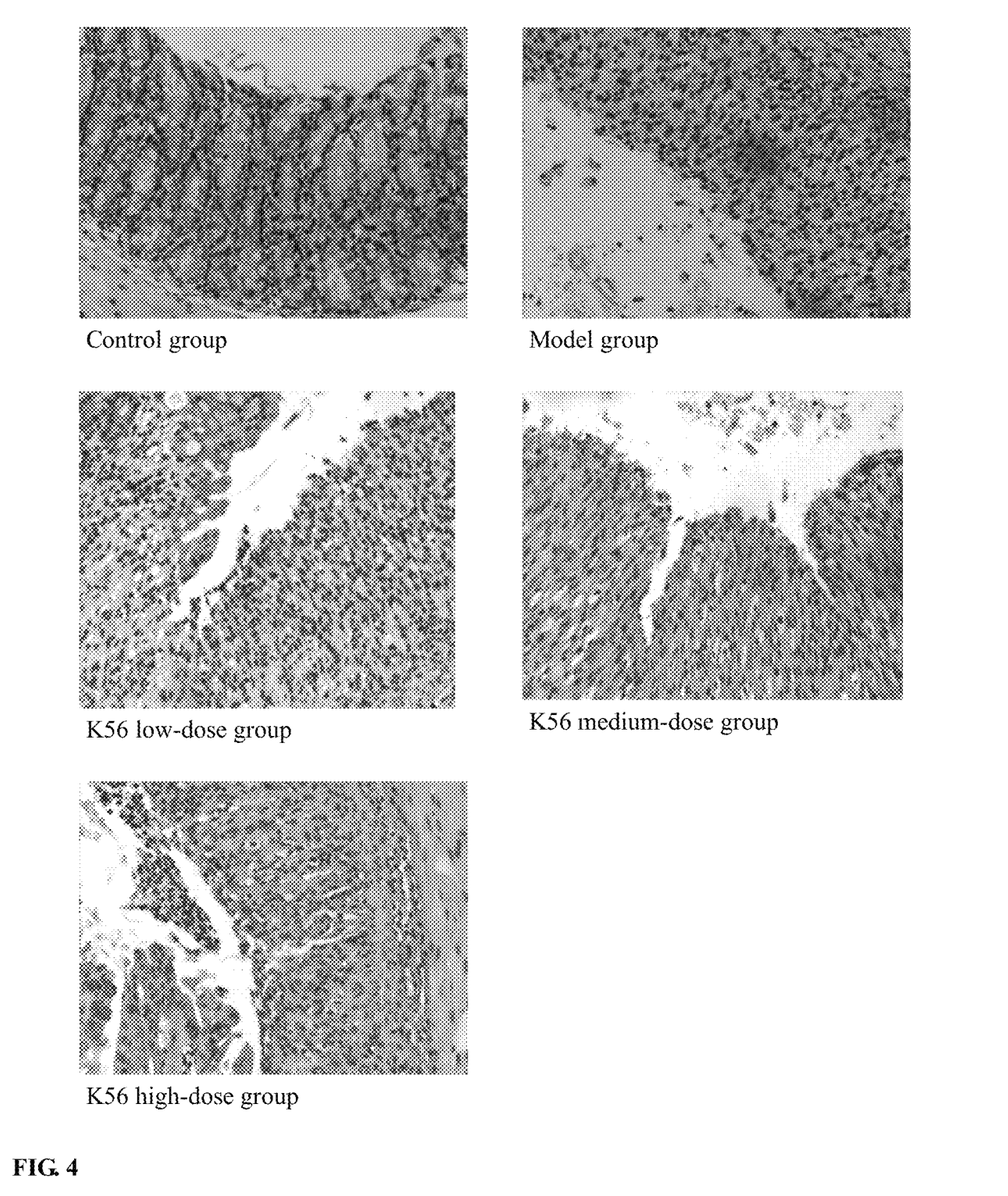
FIG. 4 shows the results of pathological sections for the effect of *Lactobacillus paracasei* subsp. *paracasei* K56 on mice.

The results of pathological sections are shown in FIG. 4. Histological observation of mice in the control group showed intact colonic epithelial cells and clear recess structures and goblet cells. Histological observation of colitis mice in the model group induced by DSS showed that intact colonic epithelial cells could not be seen, and also showed incomplete recess and damaged goblet cells, with the damaged area being more than 50%, and in some mice the recesses disappeared completely and the goblet cells were destroyed completely. Inflammatory cell infiltration, such as neutrophils and lymphocytes, can also be observed in the mice.

Mice modeled by DSS after K56 intervention showed inflammatory cell infiltration, disappearance of a few recesses, and destruction of goblet cells, with a more severe inflammatory response in the low-dose group, with lesions ranging from 50 to 75%, and more limited lesions in the middle and high-dose groups, mostly within 25%.

3.4.5.2 Analysis of Histology Injury Scores in Mice

Figure 5:
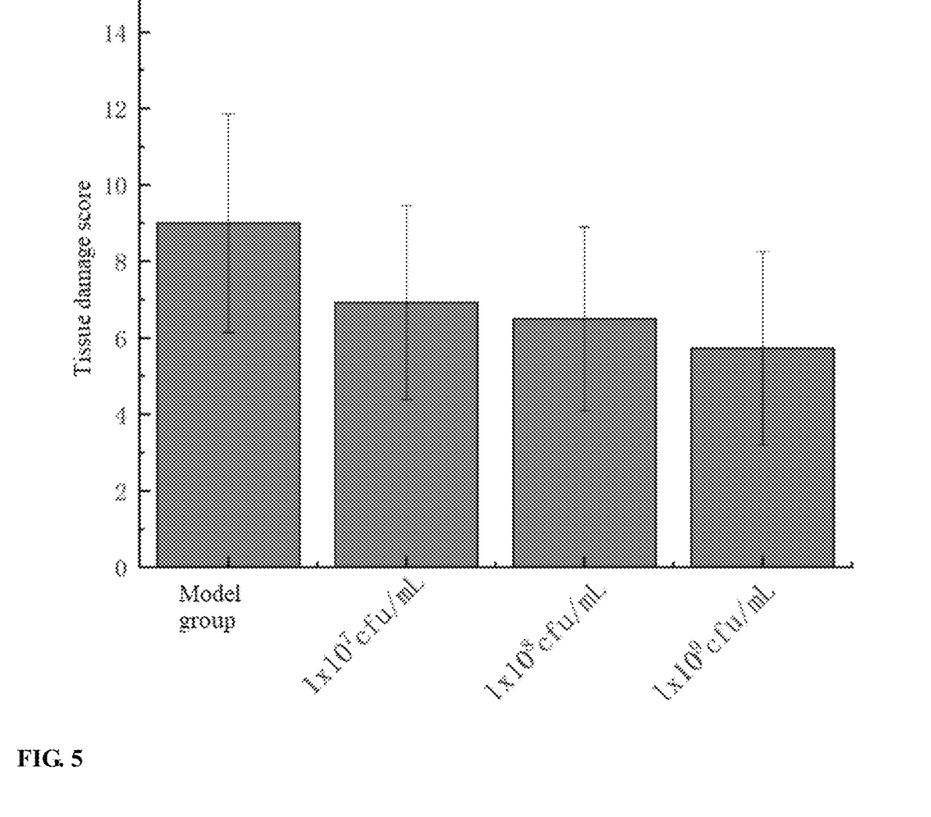
FIG. 5 shows the histology injury scores of mice under *Lactobacillus paracasei* subsp. *paracasei* K56.

The histology injury scores are shown in FIG. 5. As compared with the model group, the histological injury scores of all groups showed a decreasing trend, among which the histology injury scores of the K56 low- and high-dose groups were significantly lower than that of the model group ($p<0.05$), indicating that K56 had an effect of reducing the symptoms of colonic inflammation in mice.

DSS-induced colitis is the most common method for establishing experimental animal colitis models, which are usually formed by allowing mice to drink freely for about 7 days. In this test, 5% DSS was used as the modeling concentration, and the model group had no death, and the mice started to have bloody stools on the third day, with the blood in stools and the number of mice having bloody stools increasing with time, indicating that the model was established with good stability. The mice in each K56 dose group showed bloody stools later than the model group, had the number of mice having bloody stools less than that of the model group and showed milder symptoms, which directly indicates the anti-inflammatory effect of the probiotic.

IL-6 is a multifunctional crucial cytokine that regulates expression of other cytokines. In the course of DSS-induced experimental colitis, the level of expression of IL-6, a pro-inflammatory factor, was closely related to the degree of inflammation in colitis, and mice lacking IL-10 exhibited severe intestinal inflammation, and IL-10 showed good therapeutic effects in animal models of colitis. TNF-α is a cytokine involved in systemic inflammation. In this study, a medium dose of *Lactobacillus paracasei* subsp. *paracasei* K56 lowered the level of colonic inflammatory factor IL-6, the level of serum TNF-α and the colonic tissue injury score; and a high dose increased the level of the colonic tissue anti-inflammatory factor IL-10 and lowered the colonic tissue injury score.

The above results confirmed that *Lactobacillus paracasei* subsp. *paracasei* K56 significantly inhibits inflammatory factors IL-6 and TNF-α, elevates the level of anti-inflammatory factor IL-10, recovers the loss of colonic tissue, and is useful in food products such as fermented milk, cheese, milk-containing beverages, milk powder or any other kind of food containing the strain or derivatives thereof.

The invention claimed is:

1. A method for preventing bloody stools caused by colitis, comprising administering to a subject an effective amount of *Lactobacillus paracasei* subsp. *paracasei* K56, wherein the *Lactobacillus paracasei* subsp. *paracasei* K56 has been deposited at China General Microbiological Culture Collection Center (CGMCC) under a deposit number CGMCC 15139, and also been deposited at German Collection of Microorganisms and Cell Cultures-Deutsche Sammlung von Mikroorganismen und Zellkulturen GmbH (DSMZ) under a deposit number DSM 27447.

2. The method according to claim 1, wherein the *Lactobacillus paracasei* subsp. *paracasei* is in a form of solid or liquid bacterial preparation.

3. The method according to claim 1, wherein the *Lactobacillus paracasei* subsp. *paracasei* is in a form of a composition, the composition comprises a food composition, a feed composition or a pharmaceutical composition.

4. The method according to claim 1, wherein the *Lactobacillus paracasei* subsp. *paracasei* reduces tissue damage in colitis.

5. The method according to claim 4, wherein the *Lactobacillus paracasei* subsp. *paracasei* is administered to the subject in an amount of $1.0 \times 10^6$ CFU/day to $1.0 \times 10^{13}$ CFU/day.

6. The method according to claim 4, wherein the *Lactobacillus paracasei* subsp. *paracasei* is in a form of a food composition, preferably, the food is a fermented dairy product, cheese, a dairy-containing beverage, a solid beverage, or dairy powder.

7. The method according to claim 4, wherein the *Lactobacillus paracasei* subsp. *paracasei* is administered to the subject in an amount of $1.0 \times 10^9$ CFU/day to $1.0 \times 10^{11}$ CFU/day.

* * * * *